United States Patent
Philbin et al.

(10) Patent No.: US 6,255,369 B1
(45) Date of Patent: *Jul. 3, 2001

(54) WATER-RESISTANT, VISCOSITY STABLE, ALKALINE CORRUGATING ADHESIVE COMPOSITION

(75) Inventors: Michael T. Philbin, Hopewell, NJ (US); Norman G. Albrecht, Salisbury, NC (US)

(73) Assignee: National Starch & Chemical Investment Holding Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,821

(22) Filed: Dec. 18, 1998

Related U.S. Application Data

(63) Continuation-in-part of application No. 08/722,784, filed on Sep. 27, 1996.

(51) Int. Cl.$^7$ ................ C08J 5/10; C08L 3/00; C08L 89/00
(52) U.S. Cl. ................ 524/47; 524/49
(58) Field of Search ................ 524/47, 49, 48, 524/50

(56) References Cited

U.S. PATENT DOCUMENTS 2,833,670 * 5/1958 Roth ........................ 117/62

* cited by examiner

*Primary Examiner*—James J. Seidleck
*Assistant Examiner*—U. K. Rajguru
(74) *Attorney, Agent, or Firm*—Laurelee A. Duncan; Eugene Zagarella

(57) ABSTRACT

A water-resistant, viscosity stable, alkaline curing, starch-based corrugating adhesive composition comprising starch, an alkali material, a ketone-formaldehyde crosslinking additive containing selected sulfite salts and having reduced free-formaldehyde content, and water.

21 Claims, No Drawings

WATER-RESISTANT, VISCOSITY STABLE, ALKALINE CORRUGATING ADHESIVE COMPOSITION

This application is a continuation-in-part of application Ser. No. 08/722,784 filed Sep. 27, 1996.

BACKGROUND OF THE INVENTION

This invention relates to a starch-based, alkaline corrugating adhesive composition which contains a selected crosslinking additive that has exceptional low levels of residual formaldehyde content and helps impart good water-resistance and viscosity stability to the adhesive.

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known as a single-faced board in that the facing is applied to only one surface thereof. If a double-faced paperboard in which an inner fluted layer is sandwiched between two facings is desired, a second operation is performed wherein the adhesive is applied to the exposed tips of a single-faced board and the adhesive-coated tips are then pressed against a second facing in the combining section of the corrugator under the influence of pressure and heat. The typical corrugating process and the use and operation of corrugators in general are described in U.S. Pat. Nos. 2,051,025 and 2,102,937 to Bauer.

Starch-based adhesives are most commonly used in the corrugating process due to their desirable adhesive properties, low cost and ease of preparation.

The most fundamental of starch corrugating adhesives is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full-formulation adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond. Such adhesives are described in the above-noted patents to Bauer. Typical "no carrier" starch adhesives are described in U.S. Pat. No. 3,487,033 to McElmury et al., and U.S. Pat. No. 3,355,307 to Schoenberger et al.

It is often desired or necessary in the manufacture of corrugated paperboard that the adhesive yield water-resistant bonds which can withstand extended exposure to high humidity, liquid water, melting ice and the like. A number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. The adhesive composition itself, however, is deficient in other important properties such as corrugator bonding speeds, viscosity stability and pot life, and exhibits excessive formaldehyde odor. In addition, acidic corrugating adhesives tend to be corrosive.

The many disadvantages associated with the acidic corrugating adhesives led to the development of water-resistant alkaline curing starch-based adhesives for use in the corrugating industry. In the preparation thereof, a thermosetting resin, such as, e.g., urea-formaldehyde, resorcinol-formaldehyde, melamine-formaldehyde, phenol-formaldehyde, diacetone acrylamide-formaldehyde, ketone-aldehyde and urea-acetone-formaldehyde condensate, is added to the adhesive as a crosslinking additive for the amylaceous components to produce water-resistant bonds. Preferred among these resins for superior water-resistant properties are ketone-formaldehyde condensates as disclosed in U.S. Pat. No. 2,529,851, and particularly acetone-formaldehyde resins. Some adhesives made from such resins, however, suffer from poor pot life and viscosity instability, as well as considerable formaldehyde odor.

In recent years, due to the toxicity of and increasing governmental regulations concerning formaldehyde, serious efforts have been made to reduce the levels of exposure to formaldehyde in the industrial workplace. Acetone-formaldehyde resins such as are employed as crosslinking additives in corrugating adhesives contain about 1.0 to 4.0% free (unreacted) formaldehyde by weight of condensate. Prior attempts to reduce formaldehyde levels in crosslinking additives as taught in U.S. Pat. Nos. 3,019,120 and 3,294,716 have not reduced free-formaldehyde amounts to a significant extent and/or have resulted in diminution of the degree of water-resistance achieved in the bonds formed.

In U.S. Pat. No. 4,366,275 to Silano et al., the crosslinking additive used with the starch-based alkaline corrugating composition comprises a mixture of acetone-formaldehyde condensate and dimethylol dihydroxy ethylene urea (DMDHEU) wherein at least a portion of the DMDHEU present is produced "in situ" by reaction of the free-formaldehyde contained in the acetone-formaldehyde condensate with dihydroxy ethylene urea. The patent discloses that the unreacted formaldehyde in the acetone-formaldehyde resin condensate is reduced to about 0.1 to 2% by weight. Experience has shown, however, that in most instances the free-formaldehyde is reduced only to a level of about 0.5 to 0.9% by weight of the condensate. Current industry requirements call for still lower levels of unreacted formaldehyde.

A recent patent, U.S. 5,079,067 to Willging, discloses the reduction of free-formaldehyde in formaldehyde containing resins to a level of less than 0.3%, by weight (of aqueous resin composition), by reacting the free-formaldehyde with a nitrogen base and urea in the presence of an acid catalyst.

Another recent patent, U.S. 5,247,066 to J. Schoenberg et al., discloses another method for reducing levels of free-formaldehyde in ketone-formaldehyde crosslinking additives by treating the unreacted formaldehyde with hydrogen peroxide. This method has resulted in significant reduction in free-formaldehyde content to levels of less than about 0.4% by weight of condensate (i.e., aqueous condensate or solution).

While these methods generally provide lower free-formaldehyde levels than previously attained, they do not always provide the water-resistance, viscosity characteristics and ease of process conditions that are desired. Furthermore, there is a need and desire to develop corrugating adhesive compositions which while providing suitable water-resistance, also have reduced levels of residual formaldehyde and particularly are viscosity stable.

It has long been known to use sulfite salts to reduce formaldehyde content in different non-related technical applications such as textiles, plywood/particle board manufacture, cosmetics and paper production. However, it has heretofore not been known to use ketone-formaldehyde additives treated with selected sulfite salts in corrugating adhesives to provide compositions with good water-resistance and particularly improved viscosity stability while also providing low levels of free formaldehyde content in the additive.

SUMMARY OF THE INVENTION

It has now been found that a corrugating adhesive composition comprised of a ketone-formaldehyde condensate which is treated with selected sulfite salts provides good water-resistance and viscosity stability while also providing low levels of free-formaldehyde content.

The water-resistant, viscosity stable, alkaline curing, starch-based corrugating adhesive composition of this invention comprises:

A. from about 10 to 40% by weight based on the total weight of the adhesive, of starch;

B. from about 0.3 to 5% by weight, based on the total weight of the starch, of an alkali;

C. from about 0.3 to 12% by weight, dry basis, based on the weight of starch, of a crosslinking additive prepared by reacting a ketone and formaldehyde in a molar ratio of 1 mole of ketone to about 1.5 to 6 moles of formaldehyde under aqueous alkaline conditions at about 20 to 80° C. to obtain a water-soluble ketone-formaldehyde condensate containing about 1 to 4% by weight of unreacted formaldehyde and wherein from about 2 to 6.5 parts by weight of a water-soluble alkali metal or alkaline earth metal sulfite per part by weight of unreacted formaldehyde is added to the condensate to react with the unreacted formaldehyde present and allowing the reaction to proceed at about 20 to 45° C. at a pH of about 5 to 9 until the unreacted formaldehyde is reduced to less than about 0.6% by weight based on the weight of the condensate, and D. from about 54 to 89% by weight of water, based on the total weight of the adhesive.

DETAILED DESCRIPTION OF THE INVENTION

The starch-based corrugating adhesive composition of this invention contains a selected crosslinking additive. This crosslinking additive is initially formed by reacting a ketone and formaldehyde under aqueous alkaline conditions at about 20 to 80° C. to produce a water-soluble ketone-formaldehyde condensate containing about 1 to 4% by weight of unreacted (free) formaldehyde. The proportion of reactants will ordinarily range from about 1.5 to 6 moles of formaldehyde to about 1 mole of ketone and preferably about 2 to 4.5 moles of formaldehyde to 1 mole of ketone. In preparing the condensate, the reaction may be conducted under a nitrogen atmosphere if desired. It will be recognized that the alkalinity and reaction temperature employed must be no greater than is necessary to produce a water-soluble condensate which has not cured into an infusible product. Typically, the pH of the reaction mixture is maintained at about 8 to 12, preferably 9 to 11, by incremental addition of a solution of an alkaline agent such as sodium hydroxide. The reaction is monitored for formaldehyde content and when it is below about 3%, the product is cooled to about 25 to 45° C. and neutralized with acid such as acetic acid, glacial acetic acid, and formic acid to a pH level of 4.8 to 8.2. The reaction time depends mainly on the temperature, alkalinity and desired solids content of the reaction mixture but is ordinarily such as to obtain a water-soluble ketone-formaldehyde condensate containing about 1 to 4% by weight of free-formaldehyde. The condensate will typically have a solids content of 40 to 65% by weight.

The formed ketone-formaldehyde condensate is then treated with an effective amount of selected sulfite salt to react with the unreacted or free-formaldehyde present. In order to provide good water resistance, reduce formaldehyde content and provide viscosity stability, it has been found that selected amounts of from about 2 to 6.5 and preferably from about 2.5 to 4.5 parts by weight of sulfite compound per part by weight of unreacted formaldehyde are especially useful. The condensate/sulfite mixture is then maintained at room temperature or at a temperature of about 20 to 45° C., preferably about 25 to 35° C., and at a pH of about 5 to 9, preferably about 6.5 to 8, until the unreacted formaldehyde is reduced to less than about 0.6%, preferably less than about 0.4% and more preferably less than about 0.1% by weight based on the weight of the condensate. This usually takes a fairly short period of time, e.g., 0.5 to 2 hours or more.

In making the crosslinking additive, the ketone may be any of the known monomers of the type including acetone, methylethyl ketone, acetophenone, benzophenone, cyclohexanone, etc. Acetone and its dimers, i.e., diacetone alcohol or mesityl oxide are especially useful with acetone being particularly preferred because of its cost, availability and reactivity. Sources of formaldehyde that can be used include gaseous formaldehyde, aqueous solutions of formaldehyde, trioxymethylene, hexamethylene tetraamine and paraformaldehyde.

Reduction in free-formaldehyde for the ketone-formaldehyde condensate is provided by adding a selected amount of sulfite salt. The sulfite salts which can be used are alkali metal and alkaline earth metal salts of sulfurous acid. More particularly, alkali metal and alkaline earth metal sulfites may be used and the term sulfites includes: sulfites, bisulfites, meta-bisulfites and disulfites. Sulfites might also be generated by, for example, the use of compounds such as sulfur dioxide which are converted to sulfurous acid in the presence of water and then to a sulfite. Preferred sulfites are the sodium sulfites and more preferably sodium meta-bisulfite or sodium bisulfite. The amount of sulfite compound necessary to attain good water resistance and viscosity characteristics as well as significantly reduced free-formaldehyde levels has been found to be a selected range of from about 2 to 6.5 and preferably 2.5 to 4.5 parts by weight of sulfite compound per part by weight of unreacted formaldehyde.

The corrugating adhesive composition of this invention is comprised of starch, water, alkali, the selected low formaldehyde crosslinking additive as described herein, and optionally borax. The starch component, which may be the ungelatinized starch and/or gelatinized carrier starch portion of the adhesive composition herein may be selected from any of the several starches, native or converted, heretofore employed in starch corrugating adhesive compositions. Suitable starches include, for example, those starches derived from corn, potato, waxy maize, tapioca, sorghum, wheat, as well as high-amylose starches, i.e., starches which contain 30% or more by weight of amylose, and the various derivatives of these starches. Hence, among the applicable starches are included the various starch derivatives such as ethers, esters, thinboiling types prepared by known processes such as mild acid treatments, oxidation, etc. and those derivatives of these starches which have high amylose contents. Preferred starches are those typically employed in corrugating adhesives of the alkaline type.

The starch content of the adhesive can vary considerably depending on several factors such as the intended end-use application of the adhesive and the type of starch used. The total amount of starch employed, including gelatinized and ungelatinized portions of starch (or in the case of "no-carrier" adhesives, the total starch content), ordinarily will be in the range of about 10 to 40% by total weight of the adhesive and preferably 18 to 35%.

The remainder of the adhesive composition is composed of about 0.3 to 5% of an alkali such as sodium hydroxide, based on total weight of starch, about 0.3 to 12% on dry basis, preferably 1 to 5%, of the low formaldehyde crosslinking additive as described herein, based on total weight of starch, and about 54 to 89% of water, based on total weight of the adhesive.

If desired, small amounts of borax or other boron containing salts, up to about 5% based on the total weight of starch, may be added to the adhesive to improve the tackifying properties thereof.

The alkali (base) employed herein is preferably sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

In addition to the essential ingredients of the adhesive composition herein, any conventional non-chemically functional additives may be incorporated into the adhesive in minor amounts, if desired. Such additives include, for example, wetting agents, proteins, plasticizers, solubilizing agents, rheology modifiers, tackifiers such as borax, water conditioners, penetration control agents, peptizers such as urea, gelatinization temperature modifiers, inert fillers such as clay and finely ground polymers, thickeners such as inorganic colloidal clays, guar, hydroxyethyl cellulose, alginates, polyvinyl alcohol, polymers of ethylene oxide and the like, and emulsions such as polyvinyl acetate.

Additionally urea compounds such as urea and dihydroxyethylene urea may be added to the crosslinking additive and the adhesive composition to provide further improved stability characteristics, particularly to maintain low free-formaldehyde levels over time. Such urea compounds may be added in an effective stabilizing amount or an amount of about 0.25 to 10, preferably about 2.5 to 7.5% by weight, based on the weight of the condensate.

Further description regarding the acetone-formaldehyde crosslinking additive and the corrugating adhesive composition may be found in U.S. Patent No. 5,247,066 issued to J. Schoenberg, et al. on Sep. 21, 1993 and which is incorporated by reference herein.

In the preparation of the adhesive composition herein, a portion of the total starch required in the adhesive is gelatinized in water with caustic soda to form the carrier, which is then slowly added to a mixture of raw starch, water and optionally borax. The crosslinking additive may be added to the raw starch mixture or to the final adhesive mixture as desired. While this description of the corrugating adhesive composition is directed to a composition comprising a carrier starch and a raw starch, it may also include a no carrier composition having just a single starch component comprising an ungelatinized starch which upon subsequent treatment with alkali becomes partially swollen.

The adhesive thus obtained can be used to bond single- or double-faced boards using any equipment which is presently employed for the preparation of corrugated board. The adhesive is maintained at a temperature preferably between 25° and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

Viscosity stability is a desired characteristic of the corrugating adhesive composition of this invention. While viscosity can vary to some degree depending on application conditions and materials used, the term "viscosity stability" may be defined as the ability to maintain a minimal change in the viscosity of the corrugating adhesive. This is the change in viscosity of the corrugating adhesive composition with crosslinking additive relative to the viscosity of the corrugating adhesive without the crosslinking additive. Typically, this will be a change in viscosity of the corrugating adhesive of less than about 70% and more particularly less than about 50% after 1 hour.

The examples which follow illustrate specific embodiments of the invention. In the examples all parts and percentages are given by weight and all temperatures in degrees Celsius unless otherwise noted.

In determining the amount of free-formaldehyde contained in the acetone-formaldehyde condensates herein, a titration method was employed whereby a 12 g sample of the condensate is weighed into a 600 mL flask to which is added water and crushed ice. This is then titrated with 0.10N sodium hydroxide until a pH of 10–10.5 is attained. A sodium sulfite solution of 127 g/L is added in an amount of 50 mL and the resulting solution is titrated with 0.10N hydrochloric acid until the pH noted above is attained. The formula to determine free-formaldehyde content of the sample is:

$$\% \text{ Free-Formaldehyde} = \frac{(\text{mL } 0.10 \text{ N HCl}) \times 0.30}{\text{weight of sample (g)}}$$

EXAMPLE I

This example illustrates a representative preparation of an acetone-formaldehyde condensate which is used in the corrugating adhesive compositions of this invention and illustrated in subsequent examples.

In a reaction vessel equipped with a thermometer and means of heating and stirring, 58 g (1 mole) of acetone was combined with 253.3 g (4.2 moles) of 50% aqueous formaldehyde and the solution heated to 500 to 55° C. About 0.7 g of 6.25N sodium hydroxide was added and the mixture held at 550 to 60° C. during the exothermic reaction. An additional 21.8 g of 6.25N sodium hydroxide was added over 2.5 to 3 hours while maintaining the reaction temperature between 57° to 58° C. The reaction was continued for an additional 0.25 hours and the mixture then analyzed for formaldehyde content. When the formaldehyde concentration was below 2.5%, heating was discontinued and the condensate product cooled to 40° C. The pH was adjusted to 5 to 6 with glacial acetic acid. The free-formaldehyde content was measured at 1.42%.

EXAMPLE II

This example illustrates the addition of sodium meta-bisulfite to the acetone-formaldehyde condensate prepared in Example I and the reduction in the amount of formaldehyde in the condensate under different conditions.

In a small glass jar having a constant temperature water bath and fitted with an overhead stirrer, 300 g of the acetone-formaldehyde condensate (prepared as described above in Example I which contained 1.42% formaldehyde (0.14 moles) was combined with 13.48 g (0.07 moles) of sodium meta-bisulfite and brought up to a temperature of 25° C. The pH was adjusted with 6.25N sodium hydroxide to 6.5. The reaction was pH controlled with 0.1N sodium hydroxide or 10% acetic acid as necessary over 2 hours. The free-formaldehyde measured after 2 hours is shown in Table 1. Additional runs using different temperatures and pH were also carried out and the results shown below in Table 1.

TABLE 1

| Run No. | pH | Temp. | % Free HCHO after 2 hours |
|---|---|---|---|
| 1 | 6.5 | 25 | 0.08 |
| 2 | 7.0 | 25 | 0.05 |
| 3 | 7.5 | 25 | 0.05 |
| 4 | 8.0 | 25 | 0.06 |
| 5 | 8.5 | 25 | 0.08 |
| 6 | 6.5 | 35 | 0.06 |
| 7 | 7.0 | 35 | 0.06 |
| 8 | 7.5 | 35 | 0.05 |
| 9 | 8.0 | 35 | 0.07 |
| 10 | 8.5 | 35 | 0.12 |

EXAMPLE III

This example illustrates the addition of sodium meta-bisulfite to the acetone-formaldehyde condensate prepared in Example I in the amount of 3.2 parts by weight of sodium meta-bisulfite for every 1 part by weight of unreacted formaldehyde. This condensate with bisulfite was used in the corrugating adhesive compositions of this invention and illustrated in subsequent examples.

In a glass beaker fitted with an overhead stirrer, 1000 g of an acetone-formaldehyde condensate (prepared by the method of Example I) which contained 1.63% formaldehyde (0.54 moles) was brought up to pH 7.85 by addition of 6.25N sodium hydroxide. To the reaction at 25° C. was added 51.59 g (0.27 moles) of sodium meta-bisulfite over 19 minutes while maintaining the pH of the reaction at 7 to 8 by addition of glacial acetic acid or 6.25N sodium hydroxide as necessary. The pH was maintained at 7.5 for 2 hours by addition of 10% acetic acid or 0.1N sodium hydroxide as necessary. The solution, which contained 0.06% formaldehyde was neutralized to pH 5.36 by addition of glacial acetic acid.

EXAMPLE IV

In this example, urea is post-added after the reaction of sodium meta-bisulfite with formaldehyde in an acetone-formaldehyde condensate prepared as in Example III and containing 3.2 parts of sodium meta-bisulfite per part by weight of unreacted formaldehyde. This condensate with bisulfite is used in the corrugating adhesive compositions of this invention illustrated in subsequent examples.

In a glass beaker fitted with an overhead stirrer, 1000 g of an acetone-formaldehyde condensate (prepared by the method of Example I) which contained 1.63% formaldehyde (0.54 moles) was brought up to pH 7.11 by addition of 6.25N sodium hydroxide. To the reaction at 25° C. was added 51.59 g (0.27 moles) of sodium meta-bisulfite over 9 minutes while maintaining the pH of the reaction at 7 to 8 by addition of glacial acetic acid or 6.25N sodium hydroxide as necessary. The pH was maintained at 7.5 for 2 hours by addition of 10% acetic acid or 0.1N sodium hydroxide as necessary. The solution, which contained 0.06% formaldehyde was neutralized to pH 5.50 by addition of glacial acetic acid. To the reaction was added 58.0 g of urea.

EXAMPLE V

This example illustrates the addition of sodium meta-bisulfite to the acetone-formaldehyde condensate prepared in Example I in the amount of 4.4 parts by weight of sodium meta-bisulfite for every 1 part by weight of unreacted formaldehyde. This condensate with bisulfite is used in the corrugating adhesive compositions of this invention and illustrated in subsequent examples.

To a glass beaker fitted with an overhead stirrer, 800 g of an acetone-formaldehyde condensate (prepared by the method of Example I) which contained 1.42% formaldehyde (0.378 moles) and 50.34 g (0.265 moles) of sodium meta-bisulfite at 25° C. was adjusted to pH 5.0 by addition of glacial acetic acid. After 2 hours the formaldehyde content was measured to be 0.02%.

EXAMPLE VI

This example illustrates the addition of sodium meta-bisulfite to the acetone-formaldehyde condensate prepared in Example I in the amount of 6.4 parts by weight of sodium meta-bisulfite for every 1 part by weight of unreacted formaldehyde. This condensate with bisulfite is used in the corrugating adhesive compositions of this invention and illustrated in subsequent examples.

In a glass beaker fitted with an overhead stirrer, 1000 g of an acetone-formaldehyde condensate (prepared by the method of Example I) which contained 1.63% formaldehyde (0.54 moles) was brought up to pH 7.26 by addition of 6.25N sodium hydroxide. To the reaction at 25° C. was added 103.18 g (0.54 moles) of sodium-meta-bisulfite over 26 minutes while maintaining the pH of the reaction at 7 to 8 by addition of glacial acetic acid or 6.25N sodium hydroxide as necessary. The pH was maintained at 7.5 for 2 hours by addition of 10% acetic acid or 0.1N sodium hydroxide as necessary. The solution, which contained 0.005% formaldehyde was neutralized to pH 5.45 by addition of glacial acetic acid.

EXAMPLE VII

This example illustrates the addition of sodium bisulfite to the acetone-formaldehyde condensate prepared in Example I in the amount of 2.0 parts by weight of sodium bisulfite for every part by weight of unreacted formaldehyde. This condensate with bisulfite is used in the corrugating adhesive compositions of this invention and illustrated in subsequent examples.

In a glass beaker fitted with an overhead stirrer, 2250 g of an acetone-formaldehyde condensate (prepared by the method of Example I) which contained 1.63% formaldehyde (1.22 moles) was brought up to pH of 7.25 by addition of 6.25N sodium hydroxide. To the reaction at 25° C., 71.38 g (0.69 moles) of sodium bisulfite was added over 20 minutes while maintaining the pH of the reaction at 7 to 8 by addition of glacial acetic acid or 6.25N sodium hydroxide as necessary. The pH was maintained at 7.5 for 2 hours by addition of 10% acetic acid or 0.1N sodium hydroxide as necessary. The solution, which contained 0.60% formaldehyde was neutralized to pH of 5.5 by addition of glacial acetic acid.

EXAMPLE VIII

This example illustrates the addition of sodium meta-bisulfite to the acetone-formaldehyde condensate prepared in Example I in the amount of 9.5 parts by weight of sodium meta-bisulfite for every 1 part by weight of unreacted formaldehyde. This condensate with bisulfite is used in the corrugating adhesive compositions of this invention and illustrated in subsequent examples.

In a glass beaker fitted with an overhead stirrer, 1000 g of an acetone-formaldehyde condensate (prepared by the method of Example I) which contained 1.63% formaldehyde (0.54 moles) was brought up to pH 7.1 by addition of 6.25N sodium hydroxide. To the reaction at 25° C. was added 154.77g (0.81 moles) of sodium meta-bisulfite over 37 minutes while maintaining the pH of the reaction at 7 to 8 by addition of glacial acetic acid or 6.25N sodium hydroxide as necessary. The pH was maintained at 7.5 for 2 hours by addition of 10% acetic acid or 0.1N sodium hydroxide as necessary. The solution, which contained 0.005% formaldehyde was neutralized to pH 5.43 by addition of glacial acetic acid.

EXAMPLE IX

This example illustrates the addition of sodium bisulfite to the acetone-formaldehyde condensate prepared in Example I in the amount of 1.1 parts by weight of bisulfite for every part by weight of unreacted formaldehyde. This condensate with bisulfite was used in corrugating adhesive compositions and illustrated in subsequent examples.

In a glass beaker fitted with an overhead stirrer, 335.6 g of an acetone-formaldehyde condensate (prepared by the method of Example I) which contained 1.49% formaldehyde (0.17 moles) was brought up to pH of 7.25 by addition of 6.26N sodium hydroxide. To the reaction at 25° C., 5.6 g (0.054 moles) of sodium bisulfite was added over 20 minutes while maintaining the pH of the reaction at 7 to 8 by addition of glacial acetic acid or 6.25N sodium hydroxide as necessary. The pH was maintained at 7.5 for 2 hours by addition of 10% acetic acid or 0.1N sodium hydroxide as necessary. The solution, which contained 0.89% formaldehyde was neutralized to pH of 5.5 by addition of glacial acetic acid.

EXAMPLE X

The example illustrates the preparation of the corrugating adhesives representative of this invention.
Preparation of the Carrier Starch To 2836 g of water was added 748 g of a regular corn starch/high amylose corn starch blend (about 35% amylose of weight) and the resulting slurry was heated to 57° C. with stirring. About 284 g of water containing 122 g of sodium hydroxide was added to the slurry and heating was continued for about 15 minutes, after which about 2836 g of water was added to cool and dilute the resultant dispersion.
Preparation of the Fully Formulated Adhesive The carrier starch dispersion prepared above was added over a 20 minute period to a slurry of 4760 g regular corn starch, 82 g borax ($Na_2B_4O_7 \cdot 5H_2O$) and 8507 g water. The mixture was then stirred for 60 minutes, after which one of the formaldehyde condensates prepared in Examples III through IX were added to the entire adhesive or a portion of it to form Adhesives A–G. The addition amount of each of these condensates was 2.6% (dry basis) by weight of condensate on starch. Adhesive H served as a comparison control containing the condensate of Example I (no reaction with sodium meta-bisulfite), and Adhesive I served as a control containing no condensate. See Example XI and Table II for results.

EXAMPLE XI

This example illustrates the corrugating adhesive compositions of this invention which contain an acetone-formaldehyde condensate that is combined with a selected sulfite compound. These compositions were tested for properties including viscosity, wet pin adhesion and free-formaldehyde content (in the condensate) and compared with compositions outside this invention including a control which contained an acetone-formaldehyde without any sulfite added and another control which contained no acetone-formaldehyde condensate.

Table II below identifies adhesive sample compositions A–I and summarizes the viscosity, wet pin adhesion and free formaldehyde content (in condensate) of these adhesives. The compositions of this invention (Adhesives B–F) which contain the acetone-formaldehyde condensate with sulfite compounds as prepared in Examples III through VII were compared with other compositions and controls.

All adhesives were held at 37° to 39° C. with mild agitation and tested for viscosity by a Brookfield Viscometer (at 20 rpm setting) after 1 hour to measure the viscosity in centipoise. The lower numbers indicate less thickening of the adhesive.

Each adhesive was applied at 3 mil thickness by a Bird applicator to a glass plate and transferred to sheets of single-face web (of 69 lb/thousand sq ft wet strength liner and 33 lb/thousand sq ft wet strength medium) by means of direct hand pressure. The single-face web samples were then placed on top of 69 lb/thousand sq ft wet strength liner and the resultant double-faced board was bonded at 0.25 psi on a hot plate at 177° C. for 5 seconds. The bonded boards were then placed in a conditioning atmosphere of 22° C., 50% relative humidity for 24 hours, after which 2×5 inch samples of each of the boards were placed in water at 22° C. for 24 hours.

At the end of this period, the samples were evaluated by a wet pin adhesion test based on that of TAPPI Standard T 821 OM 87, using a conventional testing apparatus obtainable from Testing Machines Incorporated, Mineola, N.Y. The results were recorded in pounds (per 24 inches of glue line) required to separate completely the double-face liner from the single-face web. The results are indicated in Table II, with the highest results representing the best results.

TABLE II

| Adhesive | Crosslinking Condensate | Condensate (Parts Sulfite/ Part of HCHO) | % Free HCHO in Condensate | 1 Hr. Viscosity (CPS) | Wet Pin Adhesion (Lbs.) |
|---|---|---|---|---|---|
| A | Ex. VIII | 9.5 | 0.005 | 388 | 16.8 |
| B | Ex. VI | 6.4 | 0.005 | 386 | 18.4 |
| C | Ex. V | 4.4 | 0.02 | 530 | 19.8 |
| D | Ex. IV | 3.2 | 0.06 | 418 | 21.5 |
| E | Ex. III | 3.2 | 0.06 | 444 | 20.2 |
| F | Ex. VII | 2.0 | 0.60 | 610 | 19.3 |
| G | Ex. IX | 1.1 | 0.89 | 750 | 18.4 |
| H (Control) | Ex. I | 0 | 1.63 | 1020 | 22.7 |
| I (Control) | none | — | — | 365 | 0 |

The results shown in Table II illustrate the significance of using acetone-formaldehyde condensates containing sulfite compounds in adhesive compositions in the defined range in accordance with this invention. The compositions of this invention, illustrated by Adhesives B through F, when compared to control H (composition with same acetone-formaldehyde condensate without added sulfite) provide significantly reduced free formaldehyde (in the condensate) while maintaining good wet pin adhesion or water resistance and also showing good viscosity stability. This relatively stable viscosity property is evidenced by viscosity levels which remain close to that of control Adhesive I (composition which has no condensate).

In contrast, test samples containing sulfite compounds in amounts outside the specified range, i.e., Adhesives A and G, exhibited poor results in one or more of the desired properties of water resistance, formaldehyde content and viscosity stability. In Adhesive A when using a higher amount of sulfite (9.5 parts of sulfite/part of unreacted formaldehyde), while formaldehyde and viscosity levels were acceptable, the water resistance or wet pin was significantly lower. When using lower amounts of sulfite as illustrated in Adhesive G (1.1 parts sulfite), the amount of free formaldehyde was higher at 0.89% and the viscosity after 1 hour was noticeably increased compared to the samples of this invention, i.e., adhesive samples B–F.

EXAMPLE XII

This example further illustrates the improved more stable viscosity that results when using the acetone-formaldehyde condensates prepared in accordance with this invention and which contain the defined sulfite components. The samples tested involved corrugating adhesive compositions which contained various acetone-formaldehyde condensates and 3.1 and 3.2 parts of sodium bisulfite for every part by weight of unreacted formaldehyde.

A 1:4.2 acetone:formaldehyde condensate was prepared by combining 137.5 g (2.37 moles) of acetone with 805.8 g (9.93 moles) of 37% aqueous formaldehyde in a reaction vessel equipped with thermometer and heating and stirring means. The solution was heated to 50 to 55° C. Sodium hydroxide (6.25N) was added over three hours to maintain control of the pH at 10.5 to 11.0 while the reaction temperature was maintained between 57 to 58° C. The reaction was continued for an additional one hour and the condensate cooled to 40° C. The pH was adjusted to 5 to 6 with glacial acetic acid and the free-formaldehyde content was measured at 2.02%.

Sodium bisulfite was added to the above prepared condensate in an amount of 3.1 parts of sodium bisulfite for every part by weight of formaldehyde as follows. In a glass beaker fitted with an overhead stirrer, 300 g of the 1:4.2 acetone:formaldehyde condensate prepared above and which contained 2.02% formaldehyde was brought up to pH of 7.25 using 6.25N sodium hydroxide. To the reaction at 25° C., 18.90 g of sodium bisulfite was added over 20 minutes while maintaining the pH of the reaction at 7 to 8 by addition of glacial acetic acid or 6.25N sodium hydroxide as necessary. The pH was maintained at 7.20 to 7.45 for two hours by addition of 10% acetic acid or 0.1N sodium hydroxide as necessary. The solution, which contained 0.073% formaldehyde was neutralized to pH of 5.6 by addition of glacial acetic acid.

A corrugating adhesive was prepared using the crosslinking condensate prepared above in accordance with the procedure described in Example X. This adhesive sample, identified as Adhesive J was then measured for viscosity and wet pin adhesion as described in Example XI. Additional corrugating adhesives having different acetone:formaldehyde ratios (1:3.3- Adhesive L and 1:2.4- Adhesive N) were prepared and evaluated in the same manner with the results shown in Table III.

The results shown in Table III illustrate that adhesive compositions made with acetone-formaldehyde condensates and combined with sulfite in accordance with this invention, i.e., samples J, L and N provide very stable viscosity as compared and contrasted with adhesives containing the same condensates but not treated with sulfite, i.e., samples K, M, and O respectively.

TABLE III

| Adhesive | Crosslinking Condensate Acetone: Formaldehyde (mole:mole) | Part Sulfite/ Part HCHO | % Free HCHO | Wet Pin Adhesive (lbs.) | Viscosity (cps) | | | |
|---|---|---|---|---|---|---|---|---|
| | | | | | 1 hr. | 2 hr. | 4 hr. | 24 hr. |
| J | 1:4.2 | 3.1 | 0.073 | 15.0 | 324 | 318 | 310 | 318 |
| K | 1:4.2 | — | 2.02 | 15.3 | 442 | 486 | 496 | 565 |
| L | 1:3.3 | 3.1 | 0.069 | 16.1 | 308 | 302 | 294 | 310 |
| M | 1:3.3 | — | 0.93 | 15.2 | 358 | 378 | 446 | 835 |
| N | 1:2.4 | 3.2 | 0.043 | 18.5 | 346 | 356 | 405 | 456 |
| O | 1:2.4 | — | 1.77 | 17.5 | 404 | 454 | 620 | 2520 |
| P-Control | — | — | | | 304 | 304 | 284 | 266 |

What is claimed is:

1. A water-resistant, viscosity stable, alkaline curing starch-based corrugating adhesive composition comprising:
   a) from about 10 to 40% by weight, based on the total weight of the adhesive, of starch;
   b) from about 0.3 to 5% by weight, based on the total weight of starch, of an alkali;
   c) from about 0.3 to 12% by weight, dry basis, based on the weight of starch, of a crosslinking additive prepared by reacting a ketone and formaldehyde in a molar ratio of 1 mole of ketone to about 1.5 to 6 moles of formaldehyde under aqueous alkaline conditions at about 20 to 80° C. to obtain a water-soluble ketone-formaldehyde condensate containing about 1 to 4% by weight of unreacted formaldehyde and wherein from about 2 to 6.5 parts by weight of a water-soluble alkali metal or alkaline earth metal sulfite per part by weight of unreacted formaldehyde is added to the condensate to react with the unreacted formaldehyde present and allowing the reaction to proceed at about 20 to 45° C. at a pH of about 5 to 9 until the unreacted formaldehyde is reduced to less than about 0.6% by weight, based on the weight of condensate; and
   d) form about 54 to 89% by weight of water, based on the total weight of the adhesive wherein the viscosity of the adhesive composition does not increase more than 32% over 24 hours.

2. The corrugating adhesive composition of claim 1 wherein the ketone is acetone.

3. The corrugating adhesive composition of claim 1 wherein the sulfite is selected from the group consisting of alkali metal and alkaline earth metal sulfites, bisulfites, meta-bisulfites and disulfites.

4. The corrugating adhesive composition of claim 1 wherein the sulfite is sodium meta-bisulfite or sodium bisulfite.

5. The corrugating adhesive composition of claim 1 wherein from about 2.5 to 4.5 parts by weight of sulfite per part by weight of unreacted formaldehyde is used.

6. The corrugating adhesive composition of claim 1 wherein an effective stabilizing amount of urea or dihydroxyethylene urea is added to the composition.

7. The corrugating adhesive composition of claim 1 wherein the unreacted formaldehyde is reduced to less than about 0.1% by weight, based on the weight of condensate.

8. The corrugating adhesive composition of claim 1 wherein from about 1 to 5% by weight, dry basis, based on the weight of starch, of crosslinking additive is used.

9. The corrugating adhesive composition of claim 8 wherein the ketone is acetone.

10. The corrugating adhesive composition of claim 9 wherein the sulfite is selected from the group consisting of alkali metal and alkaline earth metal sulfites, bisulfites, meta-bisulfites and disulfites.

11. The corrugating adhesive composition of claim 10 wherein from about 2.5 to 4.5 parts of sulfite per part by weight of unreacted formaldehyde is used.

12. The corrugating adhesive composition of claim 11 wherein an effective stabilizing amount of urea or dihydroxyethylene urea is added to the composition.

13. The corrugating adhesive composition of claim 11 wherein acetone and formaldehyde are reacted in a molar ratio of 1 mole of acetone to about 2 to 4.5 moles of formaldehyde.

14. The corrugating adhesive composition of claim 13 wherein the unreacted formaldehyde is reduced to less than about 0.1% by weight, based on the weight of condensate.

15. The corrugating adhesive composition of claim 8 wherein from about 2.5 to 4.5 parts by weight of sulfite per part by weight of unreacted formaldehyde is used.

16. The corrugating adhesive composition of claim 15 wherein ketone and formaldehyde are reacted in a molar ratio of 1 mole of ketone to about 2 to 4.5 moles of formaldehyde.

17. The corrugating adhesive composition of claim 16 wherein the ketone is acetone.

18. The corrugating adhesive composition of claim 17 wherein the sulfite is selected form the group consisting of alkali metal and alkaline earth metal sulfites, bisulfites, meta-bisulfites and disulfites.

19. The corrugating adhesive composition of claim 18 wherein the sulfite is sodium meta-bisulfite or sodium bisulfite.

20. The corrugating adhesive composition of claim 18 wherein an effective stabilizing amount of urea or dihydroxyethylene urea is added to the composition.

21. The corrugating adhesive composition of claim 18 wherein the unreacted formaldehyde is reduced to less than 0.1% by weight, based on the weight of condensate.

* * * * *